(12) United States Patent
Green et al.

(10) Patent No.: US 9,779,430 B2
(45) Date of Patent: Oct. 3, 2017

(54) NON-RESIDENT METERING AND BILLING SYSTEM FOR APPLICATIONS AND DEVICES

(75) Inventors: Heidi A. Green, Oakland, CA (US); M. David Green, San Francisco, CA (US); Norman D. Corison, San Jose, CA (US)

(73) Assignee: FLOWCHARGE, INC., Mountain View, CA (US)

( * ) Notice: Subject to any disclaimer, the term of this patent is extended or adjusted under 35 U.S.C. 154(b) by 256 days.

(21) Appl. No.: 13/355,471

(22) Filed: Jan. 20, 2012

(65) Prior Publication Data

US 2012/0116939 A1    May 10, 2012

Related U.S. Application Data

(63) Continuation of application No. 10/086,093, filed on Feb. 26, 2002, now Pat. No. 8,122,119.

(60) Provisional application No. 60/272,255, filed on Feb. 27, 2001.

(51) Int. Cl.
*G06Q 30/04* (2012.01)
*G06F 21/10* (2013.01)

(52) U.S. Cl.
CPC ............. *G06Q 30/04* (2013.01); *G06F 21/10* (2013.01); *G06F 2221/2135* (2013.01)

(58) Field of Classification Search
CPC .......................... G06F 21/10; G06F 2221/2135
See application file for complete search history.

(56) References Cited

U.S. PATENT DOCUMENTS

| 4,783,745 | A | * | 11/1988 | Brookner et al. ............ 705/410 |
| 5,210,872 | A | | 5/1993 | Ferguson et al. |
| 5,469,543 | A | | 11/1995 | Nishibara et al. |
| 5,795,923 | A | | 8/1998 | Shahid |
| 5,815,702 | A | | 9/1998 | Kannan et al. |
| 5,825,883 | A | | 10/1998 | Archibald et al. |
| 5,892,900 | A | | 4/1999 | Ginter et al. |
| 5,898,778 | A | | 4/1999 | Antonini |
| 5,915,093 | A | | 6/1999 | Berlin et al. |
| 5,925,127 | A | | 7/1999 | Ahmad |
| 5,940,504 | A | | 8/1999 | Griswold |
| 6,021,492 | A | | 2/2000 | May |
| 6,047,242 | A | | 4/2000 | Benson |
| 6,101,606 | A | | 8/2000 | Diersch et al. |
| 6,134,659 | A | | 10/2000 | Sprong et al. |
| 6,141,698 | A | | 10/2000 | Krishnan et al. |
| 6,253,193 | B1 | | 6/2001 | Ginter et al. |
| 6,430,739 | B1 | | 8/2002 | Ballard |
| 6,662,310 | B2 | | 12/2003 | Lopez et al. |

(Continued)

*Primary Examiner* — Shay S Glass
(74) *Attorney, Agent, or Firm* — Kilpatrick Townsend & Stockton LLP

(57) ABSTRACT

A licensing envelope provides use of an application or device on a metered basis. The licensing envelope can be used with or without a connection to a computer network. In one embodiment, an application is provided with a dynamically linked library for the licensing envelope. The dynamically linked library verifies that access is enabled and calls a local licensing server when the application is opened. The local licensing server connects to and transfers data to a remote licensing server on a periodic basis. The remote licensing server can provide authorization codes for additional use of the application, bill the user, and forward payment to the application vendor.

21 Claims, 3 Drawing Sheets

(56) References Cited

U.S. PATENT DOCUMENTS

| | | |
|---|---|---|
| 6,668,338 B1 | 12/2003 | Todd et al. |
| 6,671,813 B2 | 12/2003 | Ananda |
| 6,807,534 B1 | 10/2004 | Erickson |
| 6,904,527 B1 | 6/2005 | Parlour et al. |
| 8,122,119 B1 * | 2/2012 | Green .................... G06F 21/10 709/224 |
| 2002/0094863 A1 * | 7/2002 | Klayh ............................ 463/21 |

* cited by examiner

NON-RESIDENT METERING AND BILLING SYSTEM FOR APPLICATIONS AND DEVICES

CROSS-REFERENCE TO RELATED APPLICATIONS

This application is a continuation of U.S. application Ser. No. 10/086,093, filed Feb. 26, 2002, now U.S. Pat. No. 8,122,119 entitled NON-RESIDENT METERING AND BILLING SYSTEM FOR APPLICATIONS AND DEVICES, which claims priority from U.S. provisional application No. 60/272,255, entitled LICENSING ENVELOPE FOR SOFTWARE APPLICATIONS, filed Feb. 27, 2001, the entire contents of which are herein incorporated by reference for all purposes.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

The invention relates generally to techniques for metering and billing for use of an application, service, or device that resides at the user's location.

Software applications are distributed in a variety of fashions. Many applications are distributed on media, such as magnetic disks and CD-ROMs, that a user loads (copies) onto his system. Although such applications are typically sold with a license that prohibits other users from copying the software, copying occurs. A variety of techniques have been incorporated into software to prevent unauthorized copying, such as providing the user with a separate serial number or code that must be entered to install the application from the provided media. However, unauthorized copying (i.e. "piracy" or "bootlegging") still occurs.

In order to recoup the revenue from unauthorized copying and use, application providers often must increase the unit cost of their application. Unfortunately, the more expensive a software application is, the more tempting it might be for someone to make an unauthorized copy. Thus software piracy is detrimental to both application providers and users.

Some applications have incorporated activation mechanisms that verify the user of the application and preclude coping the application to another computer; however, many users are concerned that such technology is intrusive, and a way for the application provider to gain confidential or private information about the user. Another problem with some of these methods is that they require a user's computer to be connected to a computer network, and not all computers are.

One approach to providing users affordable access to software is through an application service provider ("ASP"). ASPs have become feasible with the growth of the Internet and provide applications for online use. However, privacy is a concern for many users accessing applications through the Internet. With an on-line application, the files a user works with, as well as the application itself, often reside on a remote server that is not under the direct control of the user, and confidential information may be transmitted back and forth over a network of questionable security.

Several ASPs provide limited email and calendar applications. Use of larger applications is complicated by the bandwidth required for high-speed access to the application. The user's commands are typically transmitted to the application, which processes the command(s) and transmits return information to the user. This process can be significantly slower than if the application was resident on the user's computer. Even if the user has a high-bandwidth connection to the ASP, the perceived time of response of the application can color the user's impression of the speed of the application and possibly affect future use or the purchase of a stand-alone copy of the application.

Therefore, it is desirable to provide application developers with techniques for increasing revenue from use of their applications.

BRIEF SUMMARY OF THE INVENTION

The invention provides a licensing technique for software applications that will allow users to pay for applications that reside on the users' computers on a metered basis. A licensing envelope gives the user access to the application while tracking its usage (based on any number of variables, such as time used, files edited, print calls, etc.). The licensing feature can be included in software that is downloaded from the Internet, or in shrink-wrapped applications delivered via retail. The user does not need access to the web, as the access code can simply be transmitted across a modem line or by telephone, and the timing mechanism is built into the license feature. In other embodiments, the licensing technology is used in vending machines, pay-as-you-go cell phones, or other "smart" devices capable of communication with a licensing server that enables cash-less transactions at the device. In yet another embodiment, the licensing technique provides metered, and/or billed access to a remote database.

DETAILED DESCRIPTION OF THE INVENTION

The present invention provides techniques for metered use of an application resident on a user's computer and enables billing for that use. Any number of metrics can be used to meter use, such as time of use, file saves, file prints, program starts, or combinations of metrics can be used. The user can obtain authorization to use the application via an on-line account, a modem call, or a voice (telephone) call. In some embodiments, a number of users can be aggregated into a single account, such as corporate accounts. In other embodiments, the application might come with a free trial period, after which the user must pay for using the application or the application will not run.

A user typically receives a fresh code and will be billed each time the application is used or at the end of a billing cycle. The metered billing allows those who otherwise cannot afford to pay for an entire application to use and pay for the product according to the amount of use. This can significantly increase the application provider's customer base. The user maintains privacy of both his personal information and application data, since the application and all files related to it reside on the user's own computer rather than on a remote server, and only the user's billing information is required. Perhaps most important from the point of view of a power user of large applications, the licensing techniques of embodiments of the present invention eliminate the performance problems encountered while trying to work with an application that resides on a remote server.

I. A Closed-Loop Metering System

Figure 1A:
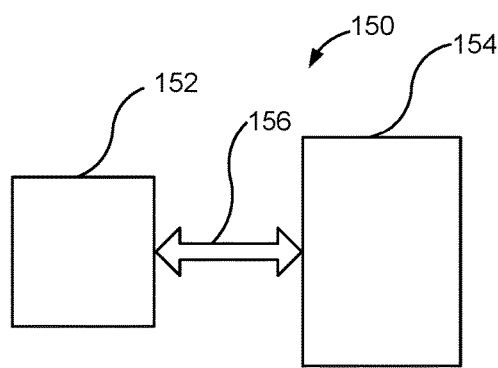
FIG. 1A is a simplified diagram of a closed-loop metering system according to an embodiment of the present invention.

FIG. 1A is a simplified diagram of a closed loop metering system 150 according to an embodiment of the present invention. Metered events remain on the client machine 152 until the server side 154 acknowledges receipt of them. The client machine 152 with an application (software) incorporating an embodiment of the present invention periodically connects to the server 154, transferring the meter data over a communications channel 156. The server 154 then acknowledges receipt of this data over the communications channel 156, removing the data from the client machine 152. Subsequent processing of this data on the server provides both billing and usage information. The communications channel 156 can be any medium over which data may be transferred; e.g. modem lines, direct connections, the Internet, wireless communications, etc.

II. An Exemplary Computer System

Figure 1B:
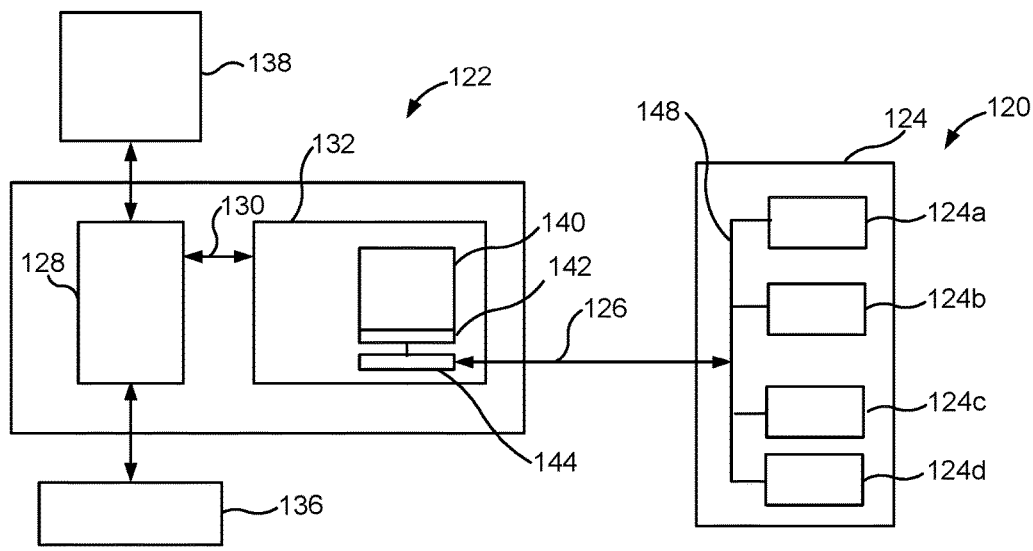
FIG. 1B is a simplified diagram of a computer system according to an embodiment of the present invention.

FIG. 1B is a simplified diagram of a computer system 120 in which some embodiments of the present invention may be implemented. In general, the computer system 120 includes a client computer 122 and a server computer 124 (additional servers 124a-124d are shown). The client computer 122 and the server computer 124 may be connected via a network 126, such as the Internet. Other embodiments do not require a network connection. It is understood that the connection between the client computer and the network is typically done through a modem or similar device, which is not shown for simplicity of illustration, and that the connection between the licensing service code 144 in memory 132 is highly simplified for purposes of discussion. The server 124 will be referred to as a remote licensing server ("RLS") for purposes of discussion. The client computer could be a personal computer or Internet device, for example.

The client computer 122 includes a central processing unit ("CPU") 128 connected via a bus 130 to memory 132, and connected to an input device 136 and an output device 138. The input device 136 can be any of a variety of devices to give input to the client computer 122. For example, a keyboard, keypad, light pen, touch screen, button, mouse, track ball, or speech recognition unit could be used. The output device 138 could be any of several types of conventional display screen, such as liquid-crystal displays ("LCDs") or cathode-ray tubes ("CRTs") and, although showing separately from the input device 136, the output device 138 and input device 136 could be combined. For example, a display screen with an integrated touch screen, and a display with an integrated keyboard, or a speech recognition unit combined with a text speech converter could be used.

While memory 132 is shown as a single entity, it should be understood that memory may include a number of types and levels. For example, the memory might include a magnetic hard disk, a magnetic floppy disk, CD-ROM, DVD-ROM, electronic ROM, and random-access memory ("RAM"). The memory 132 contains an application 140 includes licensing code 142, and licensing service code 144 or local licensing server ("LLS"). Typically, the application, the licensing code, and the licensing service code are stored on a magnetic hard drive and loaded into RAM for execution by the CPU. The software could be loaded onto the hard drive from vendor-supplied media, or downloaded over a computer network.

The licensing code could be implemented as a dynamically linked library ("DLL") or executable routine that is called by the application when the application is used. The licensing code 142 invokes the licensing service code 144, which manages metering of use of the application. Although one application and its associated licensing module is shown, several applications and their associated licensing modules could invoke and interact with the licensing service code. Different applications might have different licensing code or modules that all interface with the licensing service code. The programming and data structures may be accessed and executed by the CPU 128 as needed. Packages sent across the network 126 use a running encryption code, which will be sent by the server for the subsequent (next time) data transmission. This code can be saved (hidden) in the registry (not shown).

Each server computer generally comprises a CPU, and memory. Multiple servers 124a, 124b, 124c, 124d are connected to one another by a bus 148. The servers might include a licensing provider web server 124a, a licensing provider mail server 124b, a licensing provider database server 124c, and a licensing provider billing server 124d, although not all servers are required for all embodiments of the invention. The servers are shown as being incorporated into the licensing provider server 124, but actual server components might be physically separated, and the servers might include other components, such as displays and input devices, that are not shown.

For purposes of convenient discussion, the licensing code 142 compiled with the application 140 will be called the licensing DLL, even though the licensing code does not need to be a DLL. The licensing DLL is installed into the vendor's code package at compile time with additional hooks added into the vendor's code to call the licensing DLL initialization, counter increment, and shutdown routines. The licensing DLL and LLS are provided to the vendor for inclusion in his software package.

Once the code (application, licensing DLL, and LLS) is installed on the client's machine and invoked for the first time, a registration screen will appear, asking for registration and billing information. This information will be sent to the RLS 124 and an account will be established for this user. Options will exist on this screen for adding new products to an existing account; adding a new user/product to a corporate account, etc.

This information is supplied to the LLS, which maintains a small local database able to track multiple applications and provides the communications routines to the RLS. At regular intervals defined by the vendor, the LLS will contact the RLS 124 to transfer usage information for billing purposes. The licensing DLL 142 provides the link between the vendor's application 140 and the license operator's billing engine (RLS) via the LLS 144. The DLL will call the LLS with initialization information (product and version), timer/counter ticks, pause/resume, and shutdown information, for example. The LLS 144 provides the connection between the vendor's code (via the licensing DLL 142) and the RLS(s). It logs data to a local database, which will be uploaded to the RLS during a subsequent communication. The LLS is capable of interfacing to a number of applications with licensing DLLs simultaneously, tracking the usage of each.

Billing information is aggregated in a database on the RLS, and a periodic billing statement is generated. Information may also be used for usage analysis by both license vendor/operator and the application vendor. The RLS will then typically respond to the client computer with an authentication code enabling the vendor's application to continue running. If the client has failed to meet his licensed obligations, the server will instruct the application to cease functioning. Once a transaction connection is requested, the system will persistently try to make that connection (non-intrusively) even if power on the computer is cycled. In the event that the selected mode of communication cannot be made, the program will query the user for the connection or an alternate site.

In a particular embodiment, both the application and the licensing code have security features. By using a rolling encryption, which is checked at each client/server communication, the licensing code has a level of security that is higher than the level of security of the vendor application that uses only a license key. It is presumed that any hacking would be spent on the vendor security measures which would be more easily bypassed than the rolling encryption used by the licensing code. The licensing code will also be able to tell if the vendor application has been removed, via entries in the billing system database, which will not allow the vendor application to be deleted and reloaded just to prevent paying. This is accomplished by recording system information from the client computer in the server database and checking this information each time the vendor application is started.

In another embodiment, the LLS maintains a list of at least three RLSs (primary, secondary, fallback) for each registered application. The LLS automatically identifies which RLS (excluding the fallback server) is giving the fastest response, and will use that RLS for the transfer of data between the LLS and RLS. If none can be contacted, the LLS will use the fallback RLS, which typically is a RLS used occasionally by the license operator for other purposes, such as in-house access and product development. The fallback RLS can be used to update the connection information in case a regular RLS is moved, for example.

III. Operation of the LLS

The LLS may contain a number of general-purpose counters, which can be used to count a number of different events (file saves, file prints, time used, etc.) in various increments according to vendor preference. The vendor can define a description of these in the billing system. If the maximum count (as defined by the vendor) of any counter is exceeded, the LLS will attempt to contact the server to update usage and receive continued authorization to run. If the LLS cannot contact the server, it will continue to run and attempt to contact the server until a hard-limit count (again, as defined by the vendor) is reached. If this happens, the LLS will display a dialog box to the user requesting a connection be made to the server, and will cause the vendor's application to cease to function until the connection is made.

Once the connection is made, the data buffer, which has been encrypted by the LLS, will be sent to the RLS for processing. The vendor application will continue to function as described above. The RLS will return an encrypted acknowledgement packet (buffer) to the LLS. This buffer will contain the encryption code for the next connection and counter decrement values. These values will be subtracted from the values of the counters in the LLS.

Functions of the licensing DLL or LLS may include but are not limited to: providing status and control functions that are user available, communicating with the billing database (server), metering, encoding and decoding, timing, and storage for the license operating and security data. The license operating and security data is typically encrypted at all times, and may be stored in the registry. An authentication module may also provide information on the user's system, which prevents data from being copied or modified by others.

IV. Operation of the RLS

The communications between the RLS and the LLS can be broken down into Client to Server communications (C2S) and Server to Client (S2C). Each time a package is transferred, the buffer sent contains all information required to identify the user, the host, and the transactions that have occurred. These include, but may not be limited to, server information, latest DLL/LLS information, program information, user information, and accounting data.

The RLS may consist of a number of services, which may or may not be running on the same server, to provide billing services by the license operator for the application vendor. The RLS should be duplicated in at least one other location with both (all) servers carrying duplicate information for enhanced system reliability. The RLS software may be incorporated into a single box and sold or leased as a Web Appliance. The RLS keeps track of licensee usage, bills licensees, and sends billing reports to licensees and licensors (application vendors). The RLS maintains the license databases and performs services using the information it receives from the LLS or from the users. It determines whether the user is a customer in good standing, generates instructions that tell the licensing DLL to allow or deny access to the product, calculates payments due to the vendor and to the licensing operator, if appropriate, and may generate billing statements for the application vendor or device provider, the user, and for the licensing operator. Alternatively, user information can be provided to a billing service provider, or to the vendor for direct billing of the user. The server-side functions can also include a mail server and a web server, and can be expanded to include other services.

The billing server (see FIG. 1B, ref num 124*d*) runs license operator server code. It runs as a service on the RLS and has a graphical user interface front end for configuration. The database server (see FIG. 1B, ref num 124*c*) provides management and an SQL interface to the database (s). Information contained in the database may include license DLL/LLS information; vendor account information; vendor product information, such as product identification number, product name and version number; user account information, typically a unique user account identification number in addition to enough user information to allow billing; usage data, such as a user's billing transactions.

Functions of the server-resident utilities include but are not limited to: customer registration, user registration, services, web server, customer account signup, user account signup, user account status, report cycle to customers, report cycle to licensees, data server, SQL (e.g. as provided by ORACLE and ACCESS, among others), mail server, and billing server.

V. An Exemplary Embedded Computer System

Figure 1C:
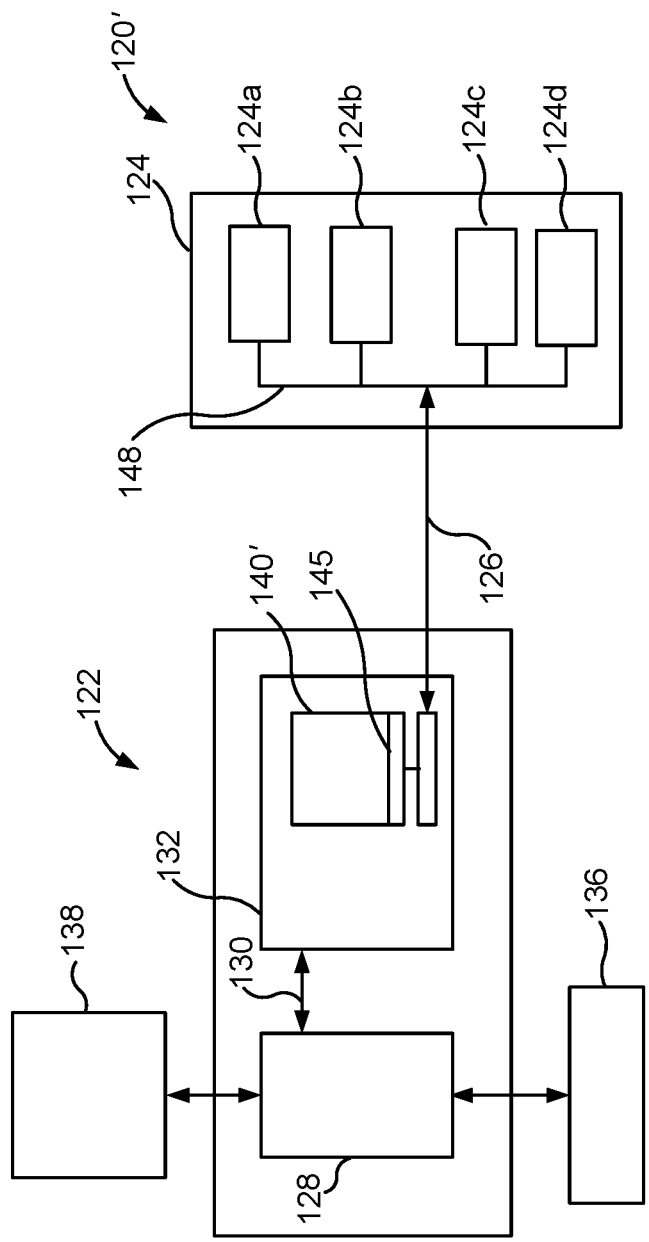
FIG. 1C is a simplified diagram of an embedded computer system according to an embodiment of the present invention.

FIG. 1C is a simplified diagram of an embedded computer system 120' in which some embodiments of the present invention may be implemented. In general, the embedded computer system 120' includes a client processor 122 and a server computer 124. The client processor 122 and the server computer 124 may be connected via a communications channel 126, such as a cellular modem. It is understood that the connection between the client processor and the network is typically done through a modem or similar device, which is not shown for simplicity of illustration, and that the connection between the licensing service code 145 in memory 132 is highly simplified for purposes of discussion. The server 124 will be referred to as a remote licensing server ("RLS") for purposes of discussion.

The client processor 122 includes a central processing unit ("CPU") 128 connected via a bus 130 to memory 132, and connected to an input device 136 and an output device 138. The input device 136 can be any of a variety of devices to give input to the client computer 122. For example, a keypad, light pen, touch screen, button, or speech recognition unit could be used. The output device 138 could be any of several types of conventional display screen, such as liquid-crystal displays ("LCDs") or light emitting diode displays ("LEDs") and, although showing separately from the input device 136, the output device 138 and input device 136 could be combined. For example, a display screen with an integrated touch screen, and a display with an integrated keyboard, or a speech recognition unit combined with a text speech converter could be used.

While memory 132 is shown as a single entity, it should be understood that memory may include a number of types and levels. For example, the memory might include a magnetic hard disk, a magnetic floppy disk, CD-ROM, DVD-ROM, electronic ROM, and random-access memory ("RAM"). The memory 132 contains an application 140' that includes licensing code 145. Typically, the application and the licensing code are stored in a ROM for execution by the CPU. The software could be loaded into the ROM from vendor-supplied media, or downloaded over a communications link.

The licensing code could be implemented as an executable routine that is called by the embedded application when the application is used. The licensing code 145 manages metering of use of the application. The programming and data structures may be accessed and executed by the CPU 142 as needed. Packages sent across the communications channel 126 use a running encryption code, which will be sent by the server for the subsequent (next time) data transmission.

Each server computer generally comprises a CPU and memory. Multiple services 124a, 124b, 124c, 124d may be running on a single computer. The services might include a licensing provider web server 124a, a licensing provider mail server 124b, a licensing provider database server 124c, and a licensing provider billing server 124d, although not all servers are required for all embodiments of the invention. The services are shown as being incorporated into the licensing provider server 124, but actual server components might be physically separated, and the servers might include other components, such as displays and input devices, that are not shown.

Once the code (embedded application and licensing code) is installed on the vendor's machine and invoked for the first time, a machine registration screen will appear, asking for registration information. This information will be sent to the RLS and an account will be established for this machine. Some devices, such as a networked vending machine, might not have a screen to display this message, and the registration step might be omitted.

The licensing code 145 provides the link between the vendor's application 140' and the license operator's billing engine (RLS 124).

Billing information is aggregated in a database on the RLS, and a periodic billing statement is generated. Information may also be used for usage analysis by both license vendor/operator. The RLS will then typically respond to the client computer with an authentication code enabling the vendor's machine to process the user's request. If the user has failed to meet his monetary obligations, the server will instruct the embedded application to ignore the user's request. At this level, a communication connection will be made on each billing tick.

VI. Exemplary Methods

Figure 2:
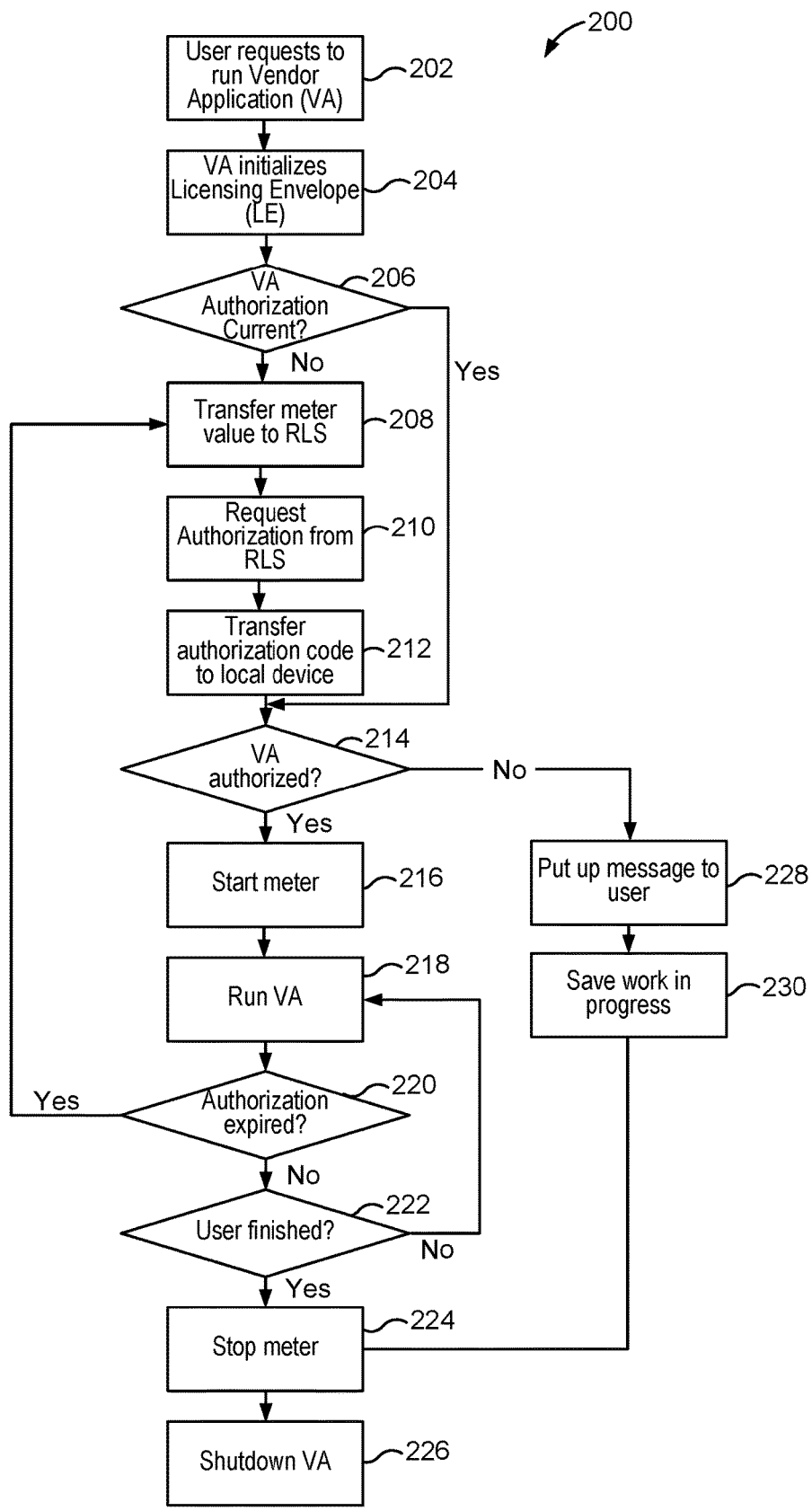
FIG. 2 is a simplified flowchart of a process according to an embodiment of the present invention.

FIG. 2 is a simplified flow chart of a licensing process 200 according to an embodiment of the present invention. When the user starts an application (step 202) on his device, it initializes the licensing envelope (step 204), which is the DLL. The DLL then determines whether the authorization to run the vendor application is current (step 206) and if it is not, initiates steps to obtain authorization.

If a meter value is present, the meter value is transferred to the RLS (step 208) The meter value may initially be zero if the application has not been previously authorized for use, or may be an accrued value after a period of authorized use. The DLL then requests authorization from the LLS for the Vendor Application (VA) to run by requesting authorization from the RLS (step 210). The RLS provides an authorization code to the local device (step 212), which typically includes an authorization value of a use metric. If authorization is received (step 214), metering for the VA is started (step 216); if not, a message is displayed to the user explaining why this application will not start (step 228) and the VA is shut down (step 226) after saving the user's work (step 230) and stopping the meter (step 224).

Once the VA is enabled, metering is started (step 216) and the user can run the VA (step 218). When the user has completed use of the VA and requests the program to terminate (step 222), metering is halted (step 224) and the VA terminates (step 226).

Regular checks by the DLL ensure that authorization to run has not expired (step 220). The LLS acts as a local repository for account information from the RLS and as an accumulator of usage information from the DLL to be forwarded to the RLS. Data exchanges between the LLS and the RLS occur in the background, minimizing impact to the VA and the user. The license operator of the RLS typically processes the charges and forwards them to a payment facilitator (e.g. credit card company or on-line payment service) for collection, but may bill a user directly and forward payment to the application vendor. The license operator might also forward usership data to the application vendor for analysis.

The authorization code typically allows the user access to the application according to a metering metric. Suitable metering metrics can be time of use, the number of times the application or database is accessed, the amount of information transferred, execution time of the application, for example. In a particular embodiment, initiating the licensing envelope automatically connects to the RLS to request an authorization code, allowing the user to access the application while the authorization code is obtained.

After access is enabled, the meter or meters in the licensing envelope is started (step 216), and the user is allowed to run the application (step 218). The licensing envelope checks whether the meter value has exceeded the authorized value (step 220), and continues to enable the application until the authorized value is exceeded, at which point the licensing envelope transfers the meter value to the RLS (step 208) so that another authorization code can be obtained to allow the user to continue using the VA. The licensing envelope can be configured to prompt the user when the authorization code is nearing expiration so that there is no disruption in use. Similarly, the licensing envelope might use a decrementing meter that is set according to the access code and counts down until a selected value is reached, such as when an elapsed time has expired.

The licensing envelope can allow the application to save the user's work before ending the application and stopping the meter (step 224). In some embodiments, the user's device can transfer the meter value to the RLS (step 208). In other applications, a user might have a credit or pre-payment arrangement with the license operator, and the licensing envelope enables the application as long as the meter value is transferred to the RLS, i.e. automatically replenishing access. Generally, periodic uploads from the user's device to the RLS, whether automatic before or after a session or manually requested over a network, modem, or telephone, allow access to the application. In an alternative embodiment, the licensing envelope stops the meter and shuts down the VA after authorization has expired, and alerts the user to obtain a new authorization or automatically seeks authorization for continued use.

VII. Exemplary Licensing Environments

In addition to metering and enabling billing for metered use of an application on a computer or computer network, embodiments of the present invention may be used in other environments including networked appliances, services such as cable television, or other devices. In the case of a software application, the licensing software may be launched when the application is opened. In the case of a service, this may happen when the service is activated or requested. In the case of a device, this may happen when the device is powered up or turned on. In an application as-discussed in Section VI, above, it is likely that the functions defined by the DLL and the LLS would be combined.

The licensing DLL or user-resident utility is launched when an application incorporating the licensing envelope is opened. The purpose of the user-resident utility is to collect the information requested by the vendor for billing purposes, maintain this information in a set of logs on the user's system, communicate this information to the license operator's server at predetermined intervals, and control the user's access to the application based on the information it receives from the license operator's server. Except for the initial launch of the application, at which time the licensing software presents the user with a set of registration windows, the communication with the licensing operator's server happens in the background, with no interaction from the user under normal usage. No information about file names, file size, file contents, or similar details are required for operation of some embodiments of the invention. This insures that the user's privacy is not compromised, and that the user's private files are not tracked or transmitted.

The communication between the licensing software and the RLS ideally happens via a high-speed perpetual connection, such as digital subscriber line ("DSL") service, frame relay, or a direct dedicated connections, but may also happen via a slower modem connection. In the latter case, the licensing software could automatically launch a remote access application on the user's system and connect to the RLS or license operator's modem.

However, remote access capability is not required in other embodiments of the invention in order to use a licensed application, service, or device. If direct connectivity is not present between the user's system and the license operator, the user may contact the license operator by telephone. A live or automatic operator (telephone system) can take the user's registration information and provide the user with an access code to enable use of the application, service, or device. The access code is good for some measured attribute of use, such as time, file saves, video rentals, etc. The user may enter the access code into an access window manually, or the code may be transmitted as a series of tones over the telephone line. The latter could allow the user to enter the code by holding the telephone receiver up to the computer's microphone.

A licensing envelope according to embodiments of the present invention can be used in a game environment, such as a multi-user game. Access to the game is obtained through a logon screen on the game vendor's website via the user's licensing account. In a particular embodiment, the cost per time of play increases with the user's skill level, and free play time can be allocated after a certain time of use or skill level has been obtained. For example, players that have achieved a high level of skill might be allocated an hour of free play every day. Various counters in the licensing software can correspond to different levels of the game, and the game invokes the different counters according to the various levels the players are active in. The information is transferred at regular intervals to the RLS, which may then bill the players.

In another embodiment, a soda vending machine has a licensing envelope that allows customers with licensing accounts to purchase drinks by entering their access codes. The licensing envelope also maintains counters to track inventory so that the supplier can be alerted when the machine needs to be restocked. The licensing envelope may also monitor onboard sensors, allowing it to act as an alarm system. If tampering triggers a sensor, the licensing envelope is activated and sends a signal to the RLS.

In yet another embodiment, a specialized application is provided to a company with a licensing envelope that allows multiple users (employees) to use the application. In a particular embodiment, several copies of the application are loaded onto a corresponding number of laptop computers. The computers are transported to a client's site, where employees of the company run the application on the computers. The application might be an expensive network analysis program, for example, that the client would not want to buy, but which facilitates the service provided by the company to its client. The company is billed according to the use of the application, and can be provided with a bill detailing the users and dates of use, which can be used to bill the application use charges through to the client.

In another environment, a cable television channel is only accessible through a licensing device (set-top box) to viewers with a licensing account. The licensing device includes a licensing envelope that allows or denies access to the channel. When a viewer tunes into the channel, the licensing envelope begins to count the minutes spent viewing the channel. The content provider can select the interval at which the licensing envelope connects to the RLS to update the minute count for the unique account associated with each cable connection. The RLS can be configured to bill the user on a periodic basis, and to terminate access if the account is overdue beyond a selected limit of access time or days from last payment. The licensing envelope can also meter at different rates according to the content being provided, for example, charging one rate for one show and a higher rate for another show, including a zero rate. The user is not charged per-show, but rather according to the time spent watching the show.

In another embodiment, confidential information, such as an electronic slide presentation or document, is stored on a server. The confidential information is secured with a licensing envelope that is activated with an access code or biometric data, such as a fingerprint. The licensing envelope tracks the time to view the presentation, or to view each slide. The presentation is automatically stopped and the viewer's access code or biometric data is removed from the access database. In some applications, the information is deleted from the server if an access metric is exceeded.

Embodiments of the present invention can be incorporated into versions of existing applications to increase market share and revenue. For example, an application has been sold for years in a shrink-wrap version with standard anti-copying measures. The application vendor can release a version with a licensing envelope according to an embodiment of the present invention, and make it freely available over a computer network and/or through distribution of copies on media, such as CDs, for a modest charge. The licensing envelope might allow several hours of free use and several file saves before the user is prompted to obtain and pay for an access code. The access code might allow continued use of the application at a selected rate according to a selected metric, such as time of use or number of files saved. Thus, the licensing envelope can provide flexible approaches to generating revenue for the application vendor, and can meter various use metrics to appropriately bill users. For example, if the billing metric is file saves instead of time of use, the user would be free to spend as much time as needed to create the end product or to familiarize himself with the application without accumulating excessive fees for use.

While the invention has been described above with respect to specific embodiments, other embodiments may be apparent to those with ordinary skill in the art. Various details of the described embodiments of the invention may be changed without departing from the spirit or scope of the invention. Therefore, the foregoing description of the embodiments of the invention is provided for the purpose of illustration only, and not for the purpose of limiting the invention as defined by the appended claims and their equivalents.

What is claimed is:

1. A non-transitory computer-readable medium having computer-executable instructions for performing a method for application licensing, the method comprising:
providing, by a server, a first authorization code to a first licensing module of a user computer to allow a user to access a first application for running on the user computer, wherein the first authorization code activates a first meter value that tracks an amount of time that the user uses the first application and/or bytes of data accessed by the user computer in relation to the first application, wherein the first meter value changes based on the time and/or the bytes of data;
providing, by the server, a second authorization code to a second licensing module of the user computer to allow the user to access a second application for running on the user computer, wherein the second authorization code activates a second meter value that tracks an amount of time that the user uses the second application or bytes of data accessed by the user computer in relation to the second application, wherein the second meter value changes based on the time or the bytes of data;
receiving, at the server from the user computer, the first meter value;
receiving, at the server from the user computer, the second meter value;
comparing, with the server, the first meter value with a first authorization value, wherein the first authorization value specifies an authorized amount of time to use the first application and/or amount of bytes of data accessed by the user computer in relation to the first application;
comparing, with the server, the second meter value with a second authorization value, wherein the second authorization value specifies an authorized amount of time to use the second application and/or amount of bytes of data accessed by the user computer in relation to the second application;
identifying a payment associated with an account of the user; and
in response to the payment by the user, changing, at the server, the first authorization value, the second authorization value, the first meter value, or the second meter value to increase access to the first or second applications by the user, wherein the increased access to the first or second applications provides the user with more time and/or data.

2. The non-transitory computer-readable medium of claim 1, wherein changing the first authorization value, the second authorization value, the first meter value, or the second meter value includes decrementing the first or second meter values.

3. The non-transitory computer-readable medium of claim 2, wherein decrementing the first or second meter values is accomplished by sending, to the user computer, a value to be subtracted from the first or second meter values.

4. The non-transitory computer-readable medium of claim 1, wherein allowing access to the first application at the user computer includes:
comparing the first meter value with a maximum count; and
in response to the first meter value exceeding the maximum count, sending a request to update authorized usage of the first application on the user computer.

5. The non-transitory computer-readable medium of claim 4, wherein the first authorization value is a hard-limit count, and wherein allowing access to the first application at the user computer includes:
comparing the first meter value with the hard-limit count; and
disabling the access by the user computer to the first application when the first meter value equals or exceeds the hard-limit count until communication to the server is established.

6. The non-transitory computer-readable medium of claim 1, wherein the payment is requested when the first meter value equals or exceeds a counter limit that is below an authorization limit.

7. The non-transitory computer-readable medium of claim 1 further wherein the first meter value changes when a database is accessed.

8. The non-transitory computer-readable medium of claim 1, wherein the first meter value is a counter of an amount of data usage, a number of events, or a timer.

9. The non-transitory computer-readable medium of claim 1, further comprising:
receiving, at the server from the user computer, other meter values of a use of other applications; and
comparing, with the server, the other meter value with other authorization values.

10. A method for application licensing, the method comprising:

providing, by a server, a first authorization code to a first licensing module of a user computer to allow a user to access a first application for running on the user computer, wherein the first authorization code activates a first meter value that tracks an amount of time that the user uses the first application and/or bytes of data accessed by the user computer in relation to the first application, wherein the first meter value changes based on the time and/or the bytes of data;

providing, by the server, a second authorization code to a second licensing module of the user computer to allow the user to access a second application for running on the user computer, wherein the second authorization code activates a second meter value that tracks an amount of time that the user uses the second application or bytes of data accessed by the user computer in relation to the second application, wherein the second meter value changes based on the time or the bytes of data;

receiving, at the server from the user computer, the first meter value;

receiving, at the server from the user computer, the second meter value;

comparing, with the server, the first meter value with a first authorization value, wherein the first authorization value specifies an authorized amount of time to use the first application and/or amount of bytes of data accessed by the user computer in relation to the first application;

comparing, with the server, the second meter value with a second authorization value, wherein the second authorization value specifies an authorized amount of time to use the second application and/or amount of bytes of data accessed by the user computer in relation to the second application;

identifying a payment associated with an account of the user; and in response to the payment by the user, changing, at the server, the first authorization value, the second authorization value, the first meter value, or the second meter value to increase access to the first or second applications by the user, wherein the increased access to the first or second applications provides the user with more time and/or data.

11. The method of claim 10, wherein changing the authorization value or the first meter value includes decrementing the first meter value.

12. The method of claim 11, wherein decrementing the first meter value is accomplished by sending, to the user computer, a value to be subtracted from the first meter value.

13. The method of claim 10, wherein allowing access to the first application at the user computer includes:

comparing the first meter value with a maximum count; and in response to the first meter value exceeding the maximum count, sending a request to update authorized usage of the first application on the user computer.

14. The method of claim 13, wherein the authorization value is a hard-limit count, and wherein allowing access to the first application at the user computer includes:

comparing the first meter value with the hard-limit count; and disabling the access by the user computer to the first application when the first meter value equals or exceeds the hard-limit count until communication to the server is established.

15. The method of claim 10, wherein the payment is requested when the first meter value equals or exceeds a counter limit that is below an authorization limit.

16. The method of claim 10 further wherein the first meter value changes when a database is accessed.

17. A system for application licensing, the system comprising:

a server, configured to provide, by the server, a first authorization code to a first licensing module of a user computer to allow a user to access a first application for running on the user computer, wherein the first authorization code activates a first meter value that tracks an amount of time that the user uses the first application and/or bytes of data accessed by the user computer in relation to the first application, wherein the first meter value changes based on the time and/or the bytes of data;

provide, by the server, a second authorization code to a second licensing module of the user computer to allow the user to access a second application for running on the user computer, wherein the second authorization code activates a second meter value that tracks an amount of time that the user uses the second application or bytes of data accessed by the user computer in relation to the second application, wherein the second meter value changes based on the time or the bytes of data;

receive, at the server from the user computer, the first meter value;

receive, at the server from the user computer, the second meter value;

compare, with the server, the first meter value with a first authorization value, wherein the first authorization value specifies an authorized amount of time to use the first application and/or amount of bytes of data accessed by the user computer in relation to the first application;

compare, with the server, the second meter value with a second authorization value, wherein the second authorization value specifies an authorized amount of time to use the second application and/or amount of bytes of data accessed by the user computer in relation to the second application;

identify a payment associated with an account of the user; and in response to the payment by the user, change, at the server, the first authorization value, the second authorization value, the first meter value, or the second meter value to increase access to the first or second applications by the user, wherein the increased access to the first or second applications provides the user with more time and/or data.

18. The method of claim 10, wherein the payment is associated with the first application for running on the user computer, the method further comprising:

changing, at the server, the first authorization value or the first meter value to increase access to the first application by the user.

19. The method of claim 18, wherein the payment is a first payment, and the method further comprising:

receiving a second payment associated with the account of the user; and changing, at the server, the second authorization value or the second meter value to increase access to the second application by the user.

20. The method of claim 10 further comprising:
in response to comparing and identifying that the first meter value exceeds the first authorization value, generating a request for the payment; and
receiving the payment associated with the account of the user.

21. The method of claim 20 further comprising:
sending the request for the payment to a payment facilitator.

\* \* \* \* \*